United States Patent
Dando, Jr. et al.

(10) Patent No.: US 7,458,208 B1
(45) Date of Patent: Dec. 2, 2008

(54) EXHAUST GAS EXTRACTOR SYSTEM

(76) Inventors: Clifford Benton Dando, Jr., R15, White Swan, 45 Mantua Grove Rd., Paulsboro, NJ (US) 08066; Steven Freundlich, 1930 Melvina Rd., Deptford, NJ (US) 08096

( * ) Notice: Subject to any disclaimer, the term of this patent is extended or adjusted under 35 U.S.C. 154(b) by 0 days.

(21) Appl. No.: 11/726,103

(22) Filed: Mar. 21, 2007

(51) Int. Cl.
*F02B 35/00* (2006.01)
*F02B 27/02* (2006.01)

(52) U.S. Cl. .......................................... 60/316; 60/312

(58) Field of Classification Search .................. 60/312, 60/316
See application file for complete search history.

(56) References Cited

U.S. PATENT DOCUMENTS

| | | | | |
|---|---|---|---|---|
| 1,370,197 A | * | 3/1921 | Bolotoff | 181/259 |
| 1,560,947 A | * | 11/1925 | Skelton | 181/263 |
| 2,396,952 A | * | 3/1946 | Huber | 181/259 |
| 4,265,332 A | * | 5/1981 | Presnall et al. | 181/211 |
| 4,313,523 A | * | 2/1982 | Copen | 181/263 |
| 4,537,027 A | * | 8/1985 | Harwood et al. | 60/323 |
| 5,282,361 A | * | 2/1994 | Sung | 60/315 |
| 5,524,434 A | * | 6/1996 | Ma | 60/290 |
| 6,167,700 B1 | * | 1/2001 | Lampert | 60/307 |
| 6,220,387 B1 | * | 4/2001 | Hoppes et al. | 181/259 |

* cited by examiner

*Primary Examiner*—Thomas Denion
*Assistant Examiner*—Loren Edwards

(57) ABSTRACT

Unobstructed, pressurized air from the forward movement of a vehicle such as a pickup, SUV or automobile is forced into an air scoop (mounted to the undercarriage of the vehicle). This air is then channeled through a section of exhaust pipe (having the fewest possible bends) parallel (with an approximate 4" separation) along the muffler to the end of the tailpipe. A section of exhaust pipe ("crossover pipe") is welded to the tailpipe outward at an acute angle which is then welded at an obtuse angle to the pressurized air pipe with both pipes being welded open to each other. As the pressurized air passes the crossover pipe, a vacuum is created in the crossover pipe pulling gases out of the tailpipe and then pushing them out of the pressurized air pipe, with this process reducing backpressure in the exhaust system and improving fuel economy.

4 Claims, 1 Drawing Sheet

Exhaust Gas Extractor System

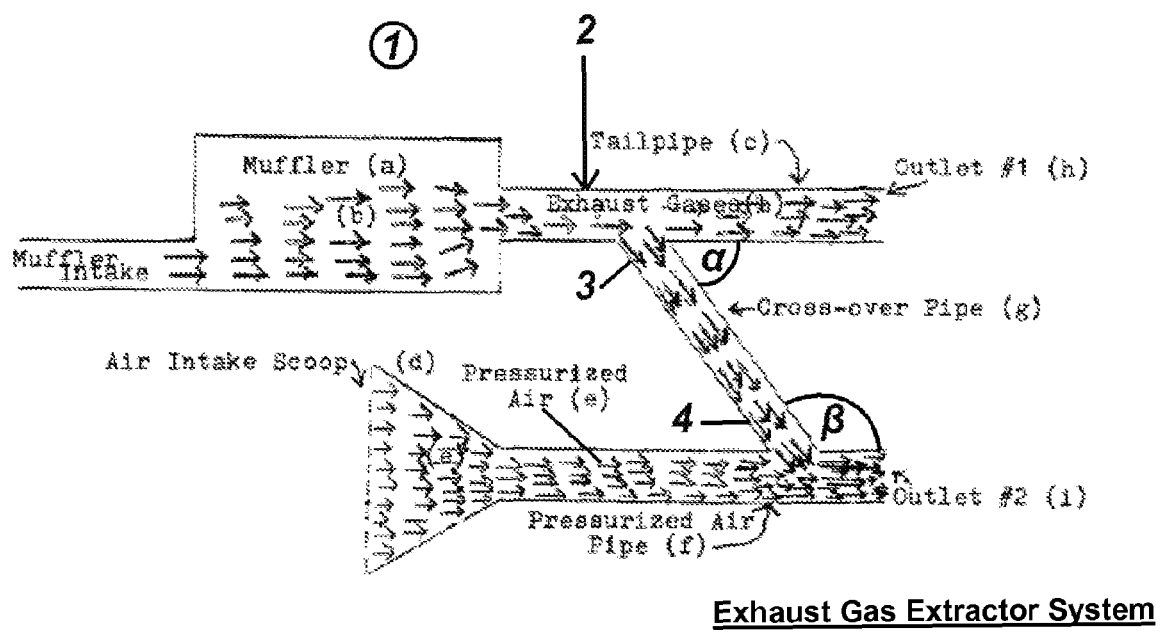
Exhaust Gas Extractor System

EXHAUST GAS EXTRACTOR SYSTEM

SUMMARY OF INVENTION

The invention is directed towards an exhaust extractor system which utilizes the venturi effect to improve engine performance.

BRIEF DESCRIPTION OF DRAWING

The single FIGURE shows an extractor system for an internal combustion engine.

DETAILED DESCRIPTION

In an exhaust extractor system (1) for reducing backpressure associated with an internal combustion engine, the exhaust extractor system comprises an exhaust system having an exhaust tailpipe (c) in fluid communication (b) with the internal combustion engine at an upstream end (2) thereof and having a downstream exhaust end opening (h) to the environment, the exhaust tailpipe having a central longitudinal axis, an air scoop (d) which forces unobstructed, pressurized air (e) from the forward movement of a vehicle is attached to a first end of a pressurized air pipe (f) extending generally parallel to but not concentrically about the exhaust pipe, the pressurized air pipe having a downstream exhaust end (i) opening at a second end to the environment, the pressurized air pipe having a central longitudinal axis; a crossover pipe (g) having a first (3) and second (4) end with a central longitudinal axis extending diagonally to the central longitudinal axis of the exhaust pipe and the central longitudinal axis of the pressurized air pipe, the crossover pipe connected at a first end (3) to the exhaust tailpipe and in fluid communication with the engine exhaust at an upstream end thereof relative to the pressurized air pipe and disposed at an obtuse angle (β) with respect to the pressurized air pipe so as to form a venturi effect on the tailpipe exhaust when the flow rate of gas in the pressurized pipe exceeds that of the tailpipe, the crossover pipe extending downstream of the first end connection and attached to and in fluid communication at the second end thereof to the pressurized air pipe near the downstream end of the pressurized air pipe; whereby a fraction of exhaust gas in the exhaust tailpipe is extracted through the crossover pipe and drawn into the pressurized air pipe and discharged out the downstream end opening of the pressurized air pipe.

Preferably, the system further comprises a muffler (a) attached to the exhaust tailpipe, the exhaust tailpipe and the pressurized air pipe are spaced apart approximately 4 inches, and the crossover pipe is attached at the first end connection (α) at an acute angle to the exhaust tailpipe and is attached at the second end connection (β) at an obtuse angle to the pressurized air pipe.

What is claimed and is desired to be protected by the U.S. Patent Office is described in the claims below:

1. An exhaust extractor system for reducing backpressure associated with an internal combustion engine comprising;

an exhaust system having an exhaust tailpipe in fluid communication with said internal combustion engine at an upstream end thereof and having a downstream exhaust end opening to the environment, said exhaust tailpipe having a central longitudinal axis, an air scoop attached to a first end of a pressurized air pipe extending generally parallel to but not concentrically about said exhaust pipe, said pressurized air pipe having a downstream exhaust end opening at a second end to said environment, said pressurized air pipe having a central longitudinal axis;

a crossover pipe having a first and second end with a central longitudinal axis extending diagonally of said central longitudinal axis of said exhaust pipe and said central longitudinal axis of said pressurized air pipe, said crossover pipe connected at a first end to said exhaust tailpipe and in fluid communication with said engine exhaust at an upstream end thereof relative said pressurized air pipe and disposed at an obtuse angle with respect to said pressurized air pipe so as to form a venturi effect on said tailpipe exhaust when the flow rate of gas in said pressurized pipe exceeds that of the tailpipe, said crossover pipe extending downstream of said first end connection and attached to and in fluid communication at the second end thereof to said pressurized air pipe near said downstream end of said pressurized air pipe;

whereby a fraction of exhaust gas in said exhaust tailpipe is extracted through said crossover pipe and drawn into said pressurized air pipe and discharged out said downstream end opening of said pressurized air pipe.

2. The system of claim 1, further comprising a muffler attached to said exhaust tailpipe.

3. The system of claim 1, wherein said exhaust tailpipe and said pressurized air pipe are spaced apart approximately 4 inches.

4. The system of claim 1, wherein said crossover pipe is attached at said first end connection at about an acute angle to said exhaust tailpipe and is attached at said second end connection at about an obtuse angle to said pressurized air pipe.

* * * * *